United States Patent
Tai

(10) Patent No.: US 8,527,019 B2
(45) Date of Patent: Sep. 3, 2013

(54) SLIDING MECHANISM AND SLIDING DEVICE

(75) Inventor: Ryusuke Tai, Kawasaki (JP)

(73) Assignee: NEC Corporation, Tokyo (JP)

( * ) Notice: Subject to any disclaimer, the term of this patent is extended or adjusted under 35 U.S.C. 154(b) by 187 days.

(21) Appl. No.: 12/996,923

(22) PCT Filed: Aug. 21, 2009

(86) PCT No.: PCT/JP2009/065012
§ 371 (c)(1),
(2), (4) Date: Dec. 8, 2010

(87) PCT Pub. No.: WO2010/024361
PCT Pub. Date: Mar. 4, 2010

(65) Prior Publication Data
US 2011/0135225 A1    Jun. 9, 2011

(30) Foreign Application Priority Data
Aug. 27, 2008    (JP) ................. 2008-218559

(51) Int. Cl.
*H04B 1/38*    (2006.01)

(52) U.S. Cl.
USPC .............. 455/575.1; 455/575.3; 455/575.4; 455/90.3; 455/347

(58) Field of Classification Search
USPC ............. 455/575.1, 575.3, 575.4, 90.3, 347
See application file for complete search history.

(56) References Cited

U.S. PATENT DOCUMENTS

| | | | | |
|---|---|---|---|---|
| 7,904,127 B2* | 3/2011 | Saitoh | ......................... | 455/575.4 |
| 2008/0188269 A1* | 8/2008 | Jin et al. | ........................ | 455/566 |
| 2009/0036181 A1* | 2/2009 | Lee | ............................. | 455/575.4 |
| 2009/0156274 A1* | 6/2009 | Wang | ........................ | 455/575.4 |

FOREIGN PATENT DOCUMENTS

| | | |
|---|---|---|
| JP | 2008035022 A | 2/2003 |
| JP | 2004320549 A | 11/2004 |
| JP | 2007049294 A | 2/2007 |
| JP | 2007116712 A | 5/2007 |
| JP | 2007174372 A | 7/2007 |
| JP | 2007177898 A | 7/2007 |
| JP | 2008092264 A | 4/2008 |
| JP | 2008193523 A | 8/2008 |
| WO | 2006038499 A | 4/2006 |

OTHER PUBLICATIONS

International Search Report for PCT/JP2009/065012 mailed Sep. 29, 2009.

* cited by examiner

*Primary Examiner* — Tuan Pham

(57) ABSTRACT

An object of the present invention is to provide a sliding mechanism with which when a state of two connected members is changed to a plurality of states by sliding, the state can be changed from an arbitrary state to another arbitrary state without passing through the other state. The sliding mechanism of the present invention is disposed between a first member and a second member and includes a body to be guided arranged on the first member and a guide body arranged on the second member and guides the body to be guided. The guide body includes an annular guide groove which guides the body to be guided. The guide groove is a groove section composed of at least three sides including an arc-shaped side and a linear side.

14 Claims, 13 Drawing Sheets

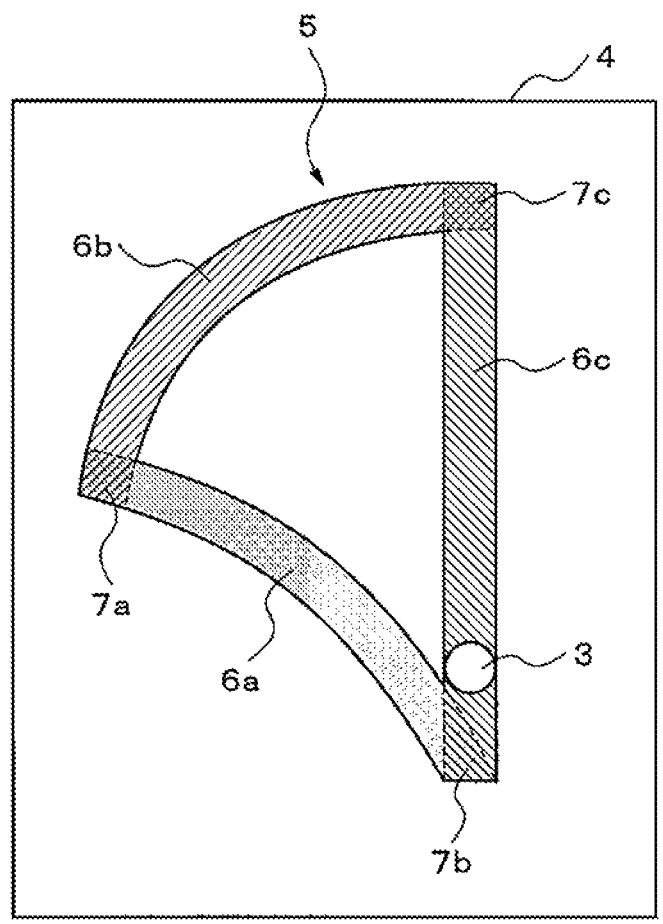

Fig.10
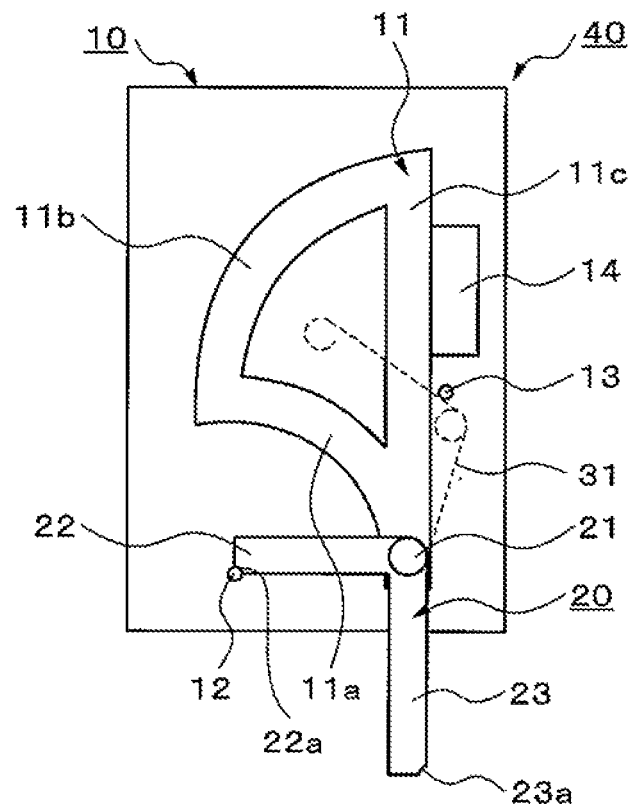
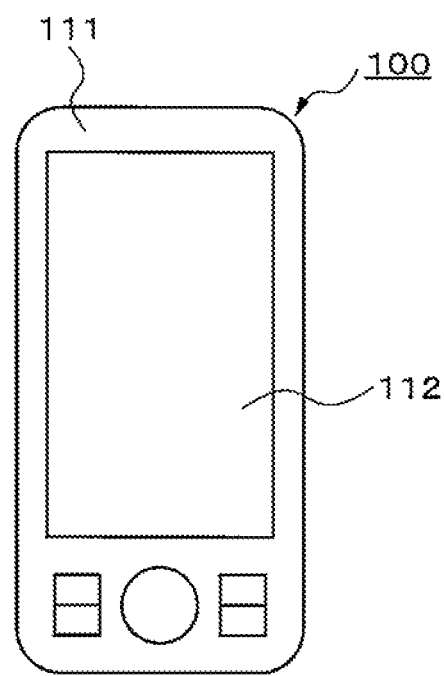

Fig.11
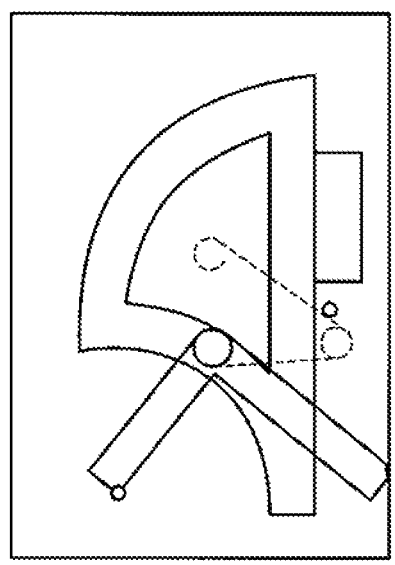
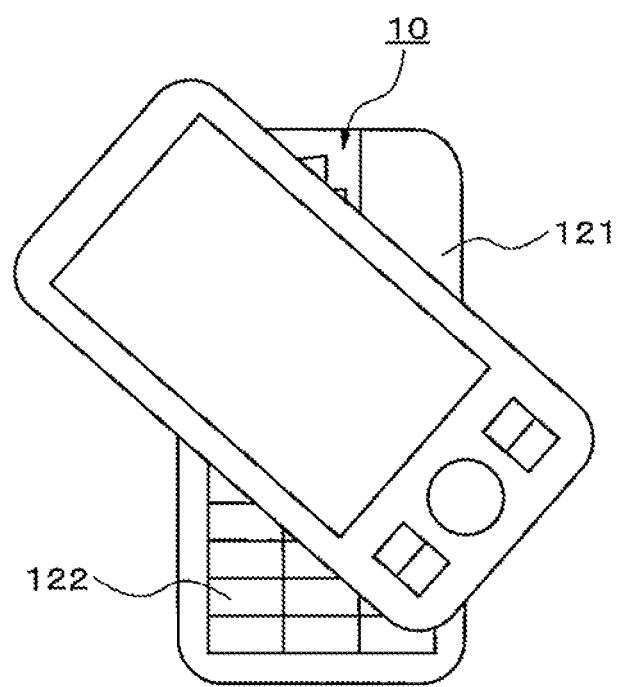

Fig.12
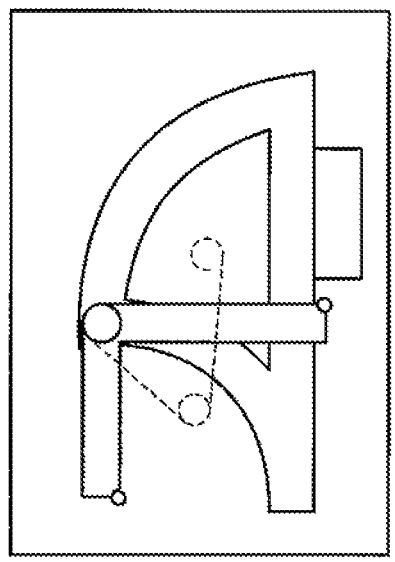
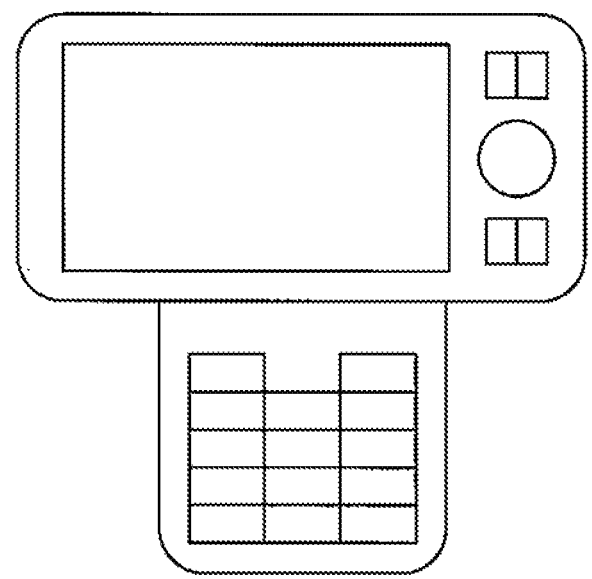

Fig.13
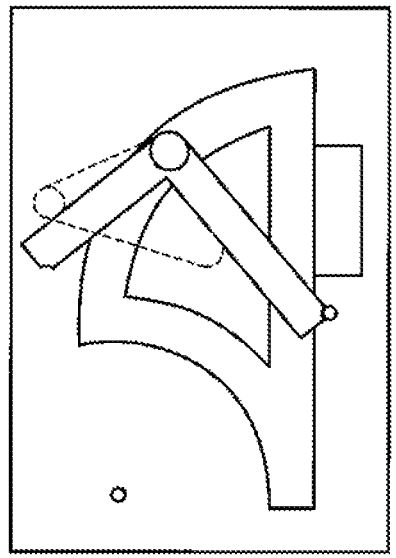
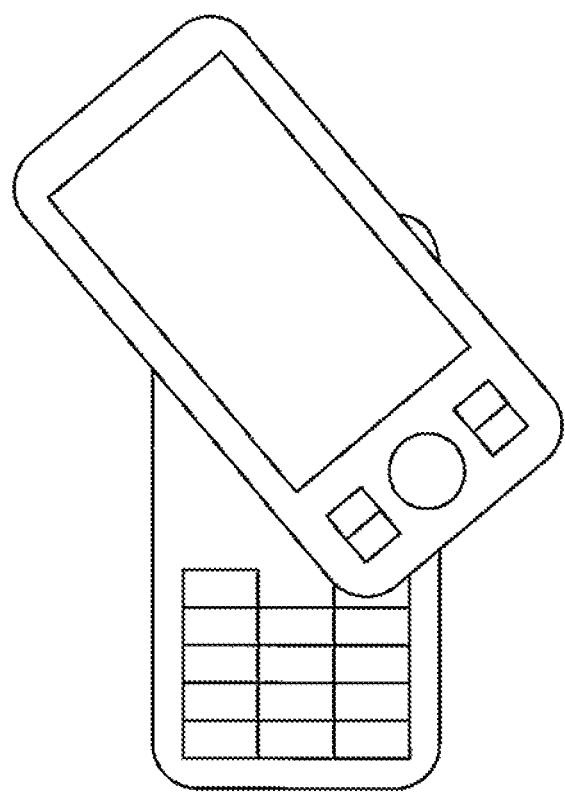

Fig.14
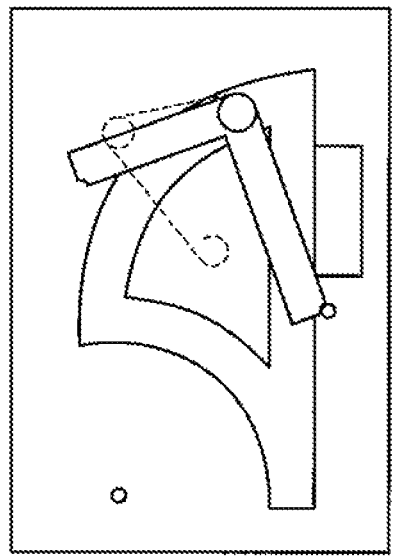
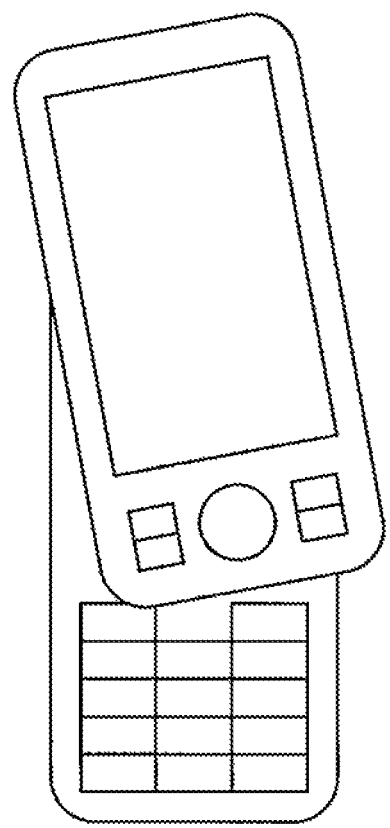

Fig.15
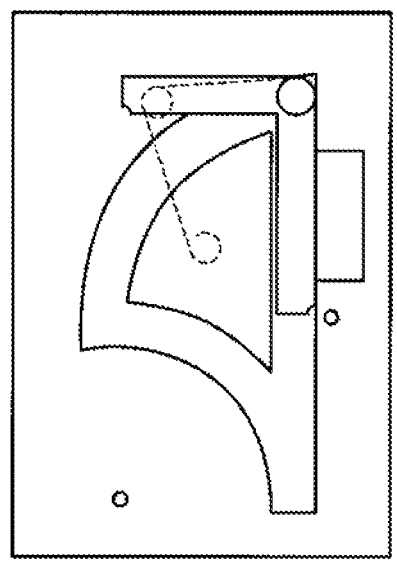
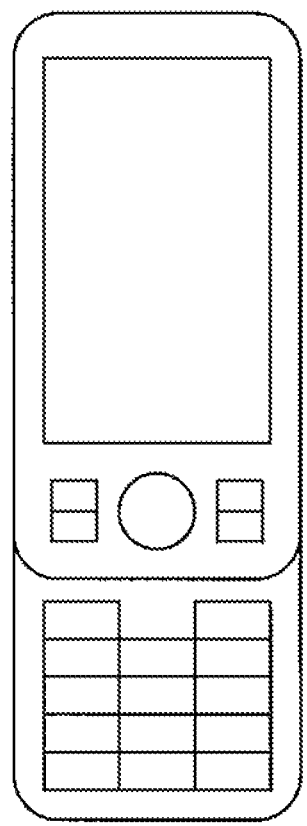

Fig.16
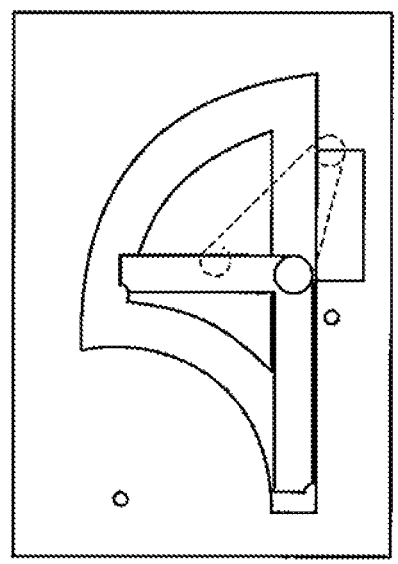
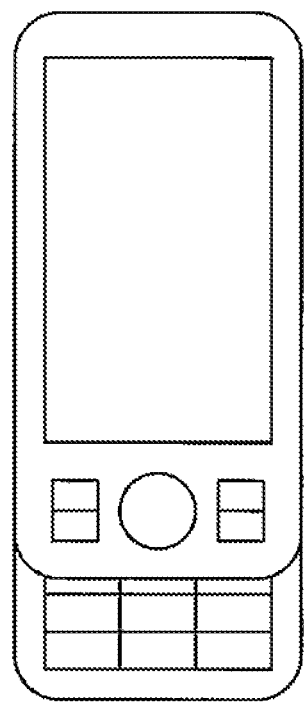

SLIDING MECHANISM AND SLIDING DEVICE

This application is the National Phase of PCT/JP2009/065012, filed Aug. 21, 2009, which claims priority based on Japanese Patent Application No. 2008-218559 filed on Aug. 27, 2008, the disclosure of which is hereby incorporated in its entirety.

TECHNICAL FIELD

The present invention relates to a sliding mechanism for connecting two members. The present invention relates to a sliding device having the sliding mechanism.

BACKGROUND ART

At the present day, a portable terminal provides various services and has multiple functions. Consequently, a shape and an operation method of the portable terminal have become diversified. For example, in the portable terminal with two rectangular-shaped cases, a closed state, a screen vertically long state, or a screen horizontally long state is selectively used. The closed state is a state in which two cases entirely overlap each other. The closed state is suitable for carrying it or at the time of being unused. The screen vertically long state is a state in which a screen is used in a vertically long direction. The screen vertically long state is suitable when a communication function or a mail function is used. The screen horizontally long state is a state in which the screen is used in a horizontally long direction. The screen horizontally long state is suitable for one-segment viewing and full browser operation.

A portable terminal whose state can be changed as mentioned above is disclosed in, for example, patent document 1 and patent document 2.

In the portable terminal described in patent document 1, a connection structure is fixed on one of the cases and it includes a guide plate, a slide plate, a rotating hinge member, rotational position restriction means, and rotation angle restriction means. The guide plate is formed along a longitudinal direction of one of the cases. The slide plate is disposed so as to face the guide plate. The slide plate can slide along the longitudinal direction of the guide plate. The rotating hinge member is fixed on the other case. The rotating hinge member is rotatably accommodated between the guide plate and the slide plate. The rotational position restriction means restrict a position at which the rotating hinge member, the slide plate, and the guide plate can rotate. The rotation angle restriction means restrict a range of an angle of relative rotation among the rotating hinge member, the slide plate and the guide plate.

A portable terminal described in patent document 2 has a hinge structure including a slide rail, an intermediate body, a fixing section, and a rotation connection section. The slide rail is fixed on an overlay surface of a first case. The intermediate body engages with the slide rail and slides on the slide rail. The fixing section is fixed on the overlay surface of a second case. The rotation connection section connects the fixing section to the intermediate body such that the fixing section can rotate.

The invention related to patent documents 1 and 2 is described in for example, patent documents 3, 4, and 5.

Patent document 1: Japanese Patent Application Laid-Open No. 2007-049294

Patent document 2: Japanese Patent Application Laid-Open No. 2008-092264

Patent document 3: Japanese Patent Application Laid-Open No. 2004-320549

Patent document 4: Japanese Patent Application Laid-Open No. 2007-177898

Patent document 5: Japanese Patent Application Laid-Open No. 2008-035022

DISCLOSURE OF THE INVENTION

Problems to be Solved by the Invention

In the portable terminal described in patent document 1 and patent document 2, a state can be changed in only one direction among three states: the closed state, the screen vertically long state, and the screen horizontally long state. Namely, the state cannot be directly changed from an arbitrary state to another arbitrary state. For example, when the state of the portable terminal is changed from the closed state to the screen horizontally long state, the change has to be achieved via the screen vertically long state. Additionally, when the state is changed from the closed state to the screen vertically long state, the state cannot be directly changed.

An object of the present invention is to provide a sliding mechanism with which when a state of two connected members is changed by sliding into a plurality of states, the state can be changed from an arbitrary state to another arbitrary state without passing through the other state.

Means for Solving the Problems

The sliding mechanism of the present invention is disposed between a first member and a second member and includes a body to be guided that is disposed on the first member and a guide body that is disposed on the second member and guides the body to be guided. The guide body has an annular guide groove which guides the body to be guided and the guide groove has at least three groove sections including an arc-shaped groove section and a linear groove section.

The sliding mechanism of the present invention is disposed between the first member and the second member. The state of two members can be changed from any one of a first state in which at least a part of the first member and a part of the second member overlap each other, a second state in which one of the first member and the second member is moved in parallel to the other member from the first state, and a third state in which one of the first member and the second member is rotated and moved relative to the other member from the first state to another arbitrary state without passing through the other state.

Advantage of the Invention

By using the present invention, for example, the state can be directly changed from any one of the first state (for example, the closed state), the second state (for example, the screen vertically long state), and the third state (for example, the screen horizontally long state) to another arbitrary state without passing through the other state.

BRIEF DESCRIPTION OF THE DRAWINGS

FIG. 1 is a schematic view showing a structure of a sliding mechanism in a first exemplary embodiment of the present invention.

FIG. 10 is a schematic plan view of a sliding mechanism in a third exemplary embodiment of the present invention (upper side) and a schematic plan view of a sliding device corresponding to the illustrated sliding mechanism (lower side).

FIG. 11 is a schematic plan view of a sliding mechanism in a third exemplary embodiment of the present invention (upper side) and a schematic plan view of a sliding device corresponding to the illustrated sliding mechanism (lower side).

FIG. 12 is a schematic plan view of a sliding mechanism in a third exemplary embodiment of the present invention (upper side) and a schematic plan view of a sliding device corresponding to the illustrated sliding mechanism (lower side).

FIG. 13 is a schematic plan view of a sliding mechanism in a third exemplary embodiment of the present invention (upper side) and a schematic plan view of a sliding device corresponding to the illustrated sliding mechanism (lower side).

FIG. 14 is a schematic plan view of a sliding mechanism in a third exemplary embodiment of the present invention (upper side) and a schematic plan view of a sliding device corresponding to the illustrated sliding mechanism (lower side).

FIG. 15 is a schematic plan view of a sliding mechanism in a third exemplary embodiment of the present invention (upper side) and a schematic plan view of a sliding device corresponding to the illustrated sliding mechanism (lower side).

FIG. 16 is a schematic plan view of a sliding mechanism in a third exemplary embodiment of the present invention (upper side) and a schematic plan view of a sliding device corresponding to the illustrated sliding mechanism (lower side).

Figure 2A:
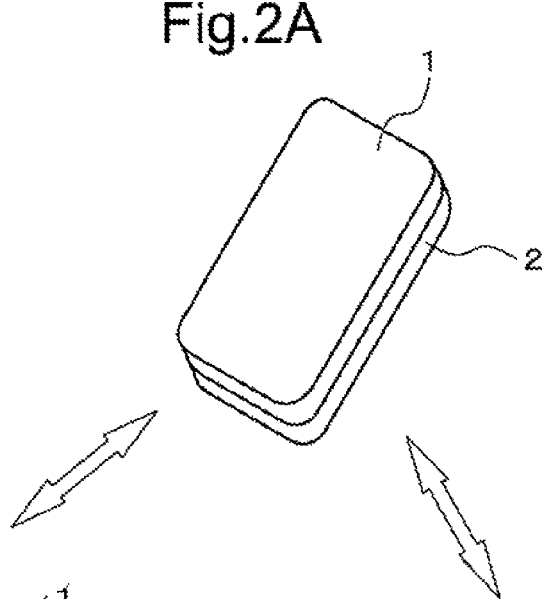
FIG. 2 is a schematic perspective view showing one example of displacement of a member using a sliding mechanism in a second exemplary embodiment of the present invention.

DESCRIPTION OF SYMBOL 1 first member
1a surface facing second member
2 second member
2a surface facing first member
3, 20 body to be guided
4, 10 guide body
5, 11 guide groove
6a arc-shaped groove section
6b arc-shaped groove section
6c linear groove section
7a intersection point of arc-shaped groove section 6a and arc-shaped groove section 6b
7b intersection point of arc-shaped groove section 6a and linear groove section 6c
7c intersection point of arc-shaped groove section 6b and linear groove section 6c
11a first groove section
11b second groove section
11c third groove section
12 first rotation shaft
13 second rotation shaft
14 engagement release section
15 third rotation shaft
16 plate-like body
21 piece to be guided
22 first rotation piece
22a first engagement section
23 second rotation piece
23a second engagement section
31 elastic member
40 sliding mechanism
100 portable terminal
111 first case
112 display section
121 second case
122 input section

MODE FOR CARRYING OUT THE INVENTION

[First Exemplary Embodiment]

A first exemplary embodiment of the sliding mechanism of the present invention will be described.

A structure of the sliding mechanism of the exemplary embodiment is shown in FIG. 1. Further, the sliding mechanism of the exemplary embodiment is disposed between the first member and the second member that are not shown in the figure.

The sliding mechanism of the exemplary embodiment includes a body 3 to be guided disposed on the first member and a guide body 4 disposed on the second member.

The guide body 4 has an annular guide groove 5 which guides the body 3 to be guided. The guide groove 5 has arc-shaped groove sections 6a and 6b and a linear groove section 6c.

Next, an operation of the sliding mechanism of the exemplary embodiment will be described.

A displacement state of the first member and the second member when the body 3 to be guided exists at an intersection point 7a of the arc-shaped groove sections 6a and 6b is defined as a first state. The displacement state of the first member and the second member when the body 3 to be guided exists at an intersection point 7b of the arc-shaped groove section 6a and the linear groove section 6c is defined as a second state. The displacement state of the first member and the second member when the body 3 to be guided exists at an intersection point 7c of the arc-shaped groove section 6b and the linear groove section 6c is defined as a third state.

When the body 3 to be guided is guided along the arc-shaped groove sections 6a or 6b, one member (for example, the first member) is relatively rotated and displaced with respect to the other member (for example, the second member).

When the body 3 to be guided is guided along the linear groove section 6c, one member (for example, the first member) is relatively moved parallel to the other member (for example, the second member).

As a result, the state can be directly changed from any one of the first state, the second state, and the third state to another arbitrary state without passing through the other state.

For example, when the state is changed from the first state to the third state, the state can be changed by guiding the body 3 to be guided along the arc-shaped groove section 6b without passing through the second state.

Further, in this exemplary embodiment, the guide groove 5 is composed of three groove sections, that are the arc-shaped groove sections 6a and 6b and the linear groove section 6c. However, it is not limited to this. Namely, if the displacement can be smoothly achieved when the first member or the second member is displaced, the arc-shaped grooves 6a and 6b and the linear groove 6c can be deformed in its groove section.

[Second Exemplary Embodiment]

A second exemplary embodiment of the sliding mechanism of the present invention will be described. At least one of two connected members can be displaced by sliding by using the sliding mechanism of the exemplary embodiment. As a result, a relative position or direction of one member relative to the other member can be changed in a stepwise and reversible fashion. FIG. 2 shows one example of the displacement of the member using the sliding mechanism of the exemplary embodiment. A first state shown in FIG. 2A shows a state in which a first member 1 and a second member 2 that are formed in the shape of a rectangular parallelepiped are connected so that a surface 1a of the first member 1 and a surface 2a of the second member 2 completely overlap each other. Further, the surface 1a of the first member 1 and the surface 2a of the second member 2 are the surfaces facing each other.

Figure 2B:
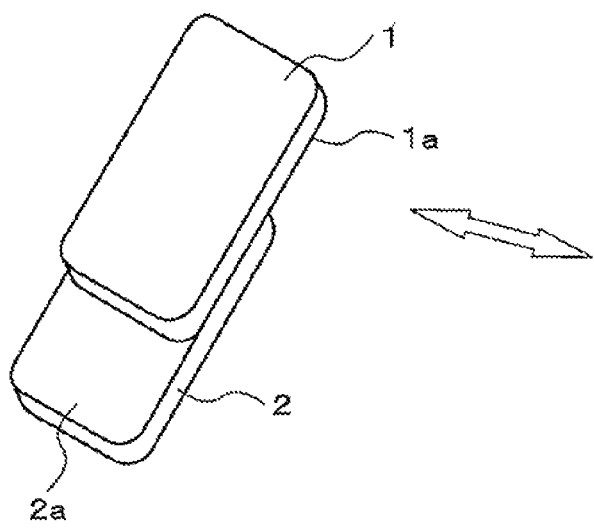
Figure 2C:
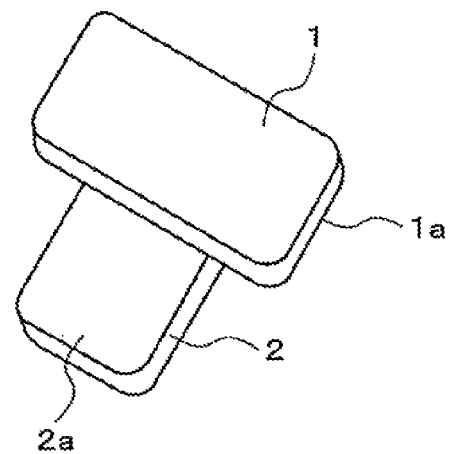

The second state shown in FIG. 2B is a state in which one member (for example, the first member 1) is moved in parallel to the other member (for example, the second member 2) in one direction from the state shown in FIG. 2A. Namely, the second state is a state in which the one member is linearly displaced relative to the other member and a part of the surface 1a and a part of 2a that face each other are exposed. The third state shown in FIG. 2C is a state in which one member (for example, the first member 1) is relatively rotated and displaced with respect to the other member (for example, the second member 2) from the state shown in FIG. 2A or FIG. 2B. By using the sliding mechanism of the present invention, the state can be easily changed from any one of the state shown in FIG. 2A, the state shown in FIG. 2B, and the state shown in FIG. 2C to another arbitrary state without passing through the other state. For example, the state can be easily changed from the state shown in FIG. 2A to the state shown in FIG. 2B without passing through the state shown in FIG. 2C.

Figure 3:
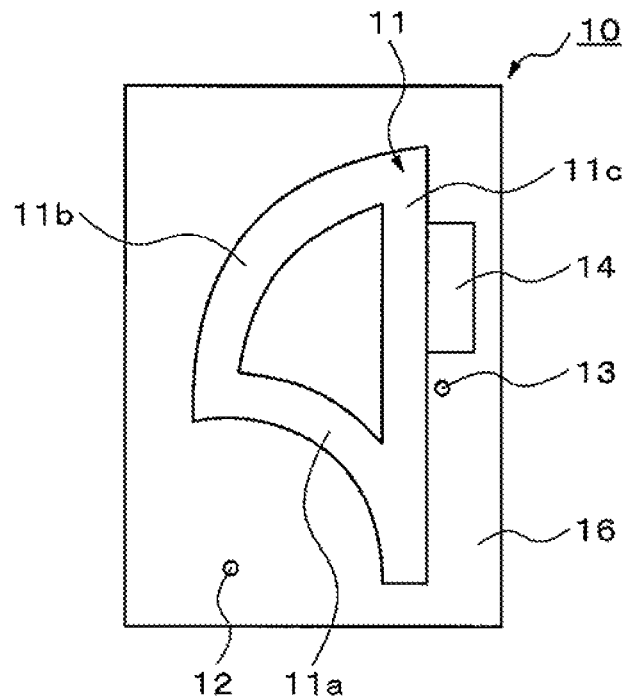
FIG. 3 is a schematic plan view of a guide body of a sliding mechanism in a second exemplary embodiment of the present invention when viewed from one surface side.
Figure 4:
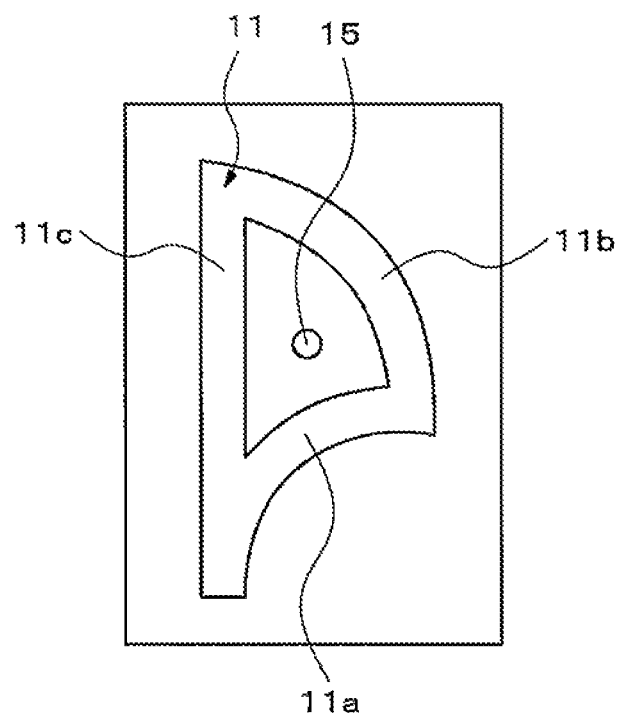
FIG. 4 is a schematic plan view of a guide body of a sliding mechanism in a second exemplary embodiment of the present invention when viewed from the other surface side.
Figure 5:
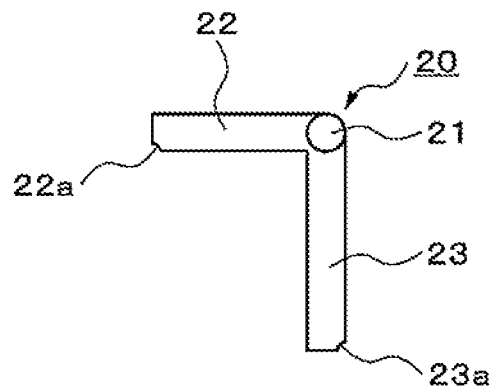
FIG. 5 is a schematic plan view of a body to be guided of a sliding mechanism in a second exemplary embodiment of the present invention.
Figure 6:
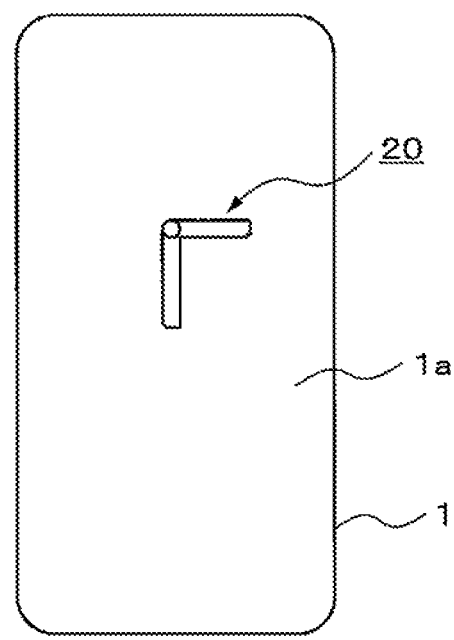
FIG. 6 is a schematic plan view of a first member on which a body to be guided is arranged in a second exemplary embodiment of the present invention.
Figure 7:
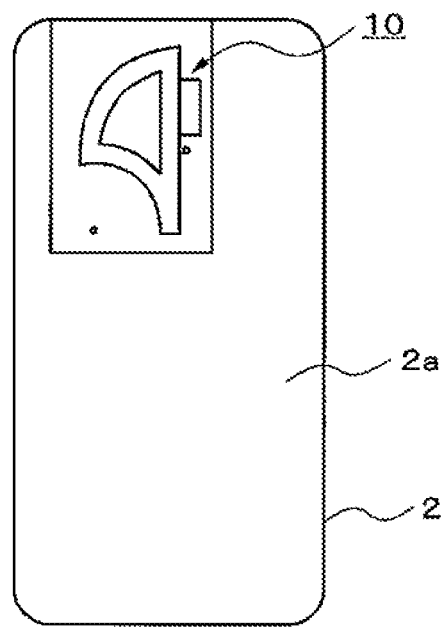
FIG. 7 is a schematic plan view of a second member on which a guide body is arranged in a second exemplary embodiment of the present invention.
Figure 8:
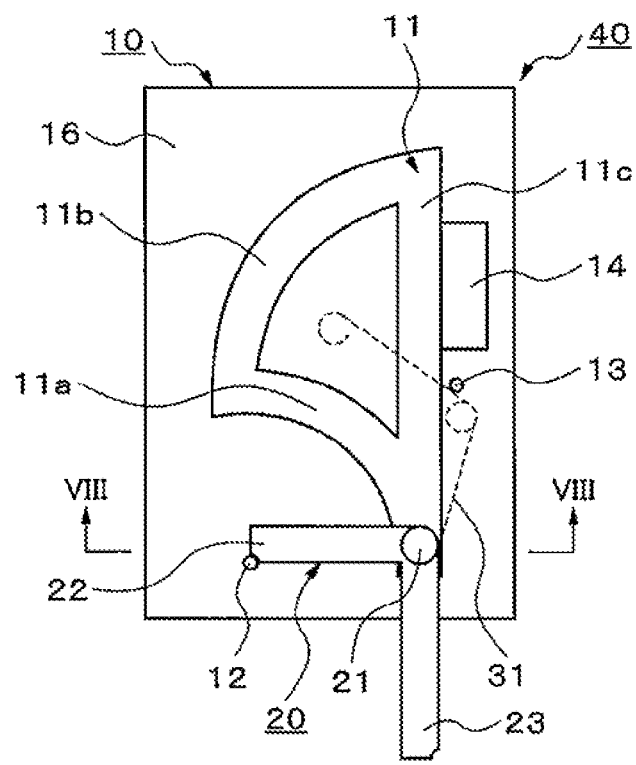
FIG. 8 is a schematic plan view of a sliding mechanism in which a body to be guided is combined with a guide body in a second exemplary embodiment of the present invention.
Figure 9:
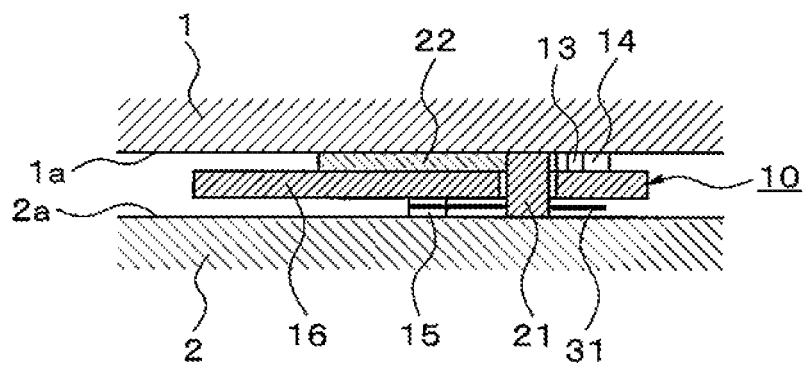
FIG. 9 is a schematic cross sectional view showing a cross section of a line VIII-VIII in FIG. 8.

One exemplary embodiment of the sliding mechanism of the exemplary embodiment will be described. The sliding mechanism of the exemplary embodiment is disposed between one member (in the exemplary embodiment, hereinafter called "first member") and the other member (in the exemplary embodiment, hereinafter called "second member"). The sliding mechanism of the exemplary embodiment includes a body to be guided, a guide body, and an elastic member. The body to be guided is arranged in a first member side. The guide body is arranged in a second member side. FIG. 3 is a schematic plan view of the sliding mechanism when viewed from one surface side (front side) of the guide body. FIG. 4 is a schematic plan view of the sliding mechanism when viewed from the other surface side (rear side) of the guide body. FIG. 5 is a schematic plan view of the body to be guided. FIG. 6 is a schematic plan view of the first member on which the body to be guided is arranged. FIG. 7 is a schematic plan view of the second member on which the guide body is arranged. FIG. 8 is a schematic plan view of the sliding mechanism of the present invention in which the body to be guided is combined with the guide body. In FIG. 8, the elastic member is a perspective view. The first member and the second member are not shown in the figure. FIG. 9 is a schematic cross sectional view showing a cross section of a line VIII-VIII in FIG. 8. The first member and the second member that are not shown in FIG. 8 are shown in FIG. 9.

A guide body 10 includes a guide groove 11, a first rotation shaft 12, a second rotation shaft 13, a third rotation shaft 15, an engagement release section 14, and a plate-like body 16. A body 20 to be guided includes a piece 21 to be guided, a first rotation piece 22, and a second rotation piece 23.

The guide groove 11 is a continuous annular groove formed on the plate-like body 16. The guide groove 11 is a through-hole. Therefore, an inside of a loop of the guide groove 11 has to be fixed in order to avoid a floating state. For example, the inside of the loop of the guide groove 11 may be fixed to the first member or the second member by using a torsion coil spring for the third rotation shaft 15. The piece 21 to be guided of the body 20 to be guided is inserted (or fitted) in the guide groove 11. The piece 21 to be guided moves along the guide groove 11 in accordance with the relative displacement of the first member 1 and the second member 2. Therefore, it is preferred that the shape of the piece 21 to be guided is for example, columnar.

In the exemplary embodiment, the guide groove 11 includes a first groove section 11a, a second groove section 11b, and a third groove section 11c. The first groove section 11a and the second groove section 11b are the groove sections for relatively rotating and displacing the first member 1 with respect to the second member 2. The first groove section 11a and the second groove section 11b are the arc-shaped grooves. The third groove section 11c is a groove section for relatively and linearly displacing the first member 1 with respect to the second member 2. The third groove section 11c is a linear groove. A direction of an arc of the first groove section 11a and a direction of an arc of the second groove section 11b are set according to a rotation direction of the first member 1 and the second member 2. In the exemplary embodiment, the first groove section 11a is an inward convex relative to the loop of the guide groove 11. On the other hand, the second groove section 11b is an outward convex relative to the loop of the guide groove 11.

The first rotation shaft 12 and the second rotation shaft 13 are the shafts for relatively rotating the first member 1 with respect to the second member 2. The first rotation shaft 12 and the second rotation shaft 13 are formed so as to engage with the first rotation piece 22 and the second rotation piece 23 of the body 20 to be guided that is fixed on the first member 1, respectively. Namely, the first rotation shaft 12 and the second rotation shaft 13 are formed on a side of the plate-like body 16 that faces the body 20 to be guided (first member 1). In the exemplary embodiment, the first rotation shaft 12 is formed outside the first groove section 11a of the loop of the guide groove 11. The second rotation shaft 13 is formed outside the third groove section 11c of the loop of the guide groove 11.

The first rotation piece 22 and the second rotation piece 23 of the body 20 to be guided extend from the piece 21 to be guided. The first rotation piece 22 and the second rotation piece 23 may be joined to the piece 21 to be guided. The first rotation piece 22 and the second rotation piece 23 may be formed in for example, a plate-like shape. The first rotation piece 22 and the second rotation piece 23 may be integrally formed. In the exemplary embodiment, an angle between the first rotation piece 22 and the second rotation piece 23 is 90 degrees. Namely, the first rotation piece 22 and the second rotation piece 23 are integrally formed in an L-shape. The first rotation piece 22 engages with the first rotation shaft 12. The piece 21 to be guided is moved along the first groove section 11a by rotating the first rotation piece 22 about the first rotation shaft 12. As a result, the first member 1 can be rotated and displaced relative to the second member 2. Accordingly, the first groove section 11a is an arc of which a center is the first rotation shaft 12 and a radius is a longitudinal length of the first rotation piece 22 schematically. Similarly, the second rotation piece 23 engages with the second rotation shaft 13. The piece 21 to be guided is moved along the second groove section 11b by rotating the second rotation piece 23 about the second rotation shaft 13. As a result, the first member 1 can be rotated and displaced relative to the second member 2. Accordingly, the second groove section 11b is an arc of which a center is the second rotation shaft 13 and a radius is a longitudinal length of the second rotation piece 23 schematically.

It is preferred that the shape of the first rotation shaft 12 and the second rotation shaft 13 is columnar so that the first rotation piece 22 and the second rotation piece 23 can be easily rotated. Moreover, it is further preferred that the first rotation shaft 12 and the second rotation shaft 13 are perpendicular to the plate-like body 16.

In order to ensure engagement between the first rotation piece 22 and the first rotation shaft 12, it is preferred that the first rotation piece 22 has a first engagement section 22a. For example, the first engagement section 22a can be formed by cutting out a part of the first rotation piece 22. The first engagement section 22a can be formed on the first rotation piece 22 in accordance with the shape and the size of the side surface of the first rotation shaft 12 so as to engage with the first rotation shaft 12 having a columnar shape. It is preferred that the first engagement section 22a is formed at a position at which the engagement with the first rotation shaft 12 is easily released, in other words, it is not easily caught when the piece 21 to be guided moves from the first groove section 11a to the second groove section 11b or the third groove section 11c. In the exemplary embodiment, the first engagement section 22a is formed at an end of the first rotation piece 22. It is preferred that the first engagement section 22a is formed at a corner of the first rotation piece 22. It is further preferred that the first engagement section 22a is formed so that the first rotation piece 22 is not caught by the first rotation shaft 12 when the piece 21 to be guided moves from the first groove section 11a to the third groove section 11c. Namely, it is further preferred that the first engagement section 22a is formed at the corner (lower side) further apart from the first groove section 11a when the body 20 to be guided is positioned at a position shown in FIG. 8.

It is preferred that the second rotation piece 23 has the second engagement section 23a in order to ensure engagement with the second rotation shaft 13. For example, the second engagement section 23a can be formed by cutting out a part of the second rotation piece 23. The second engagement section 23a can be formed on the second rotation piece 23 in accordance with the shape and the size of the side surface of the second rotation shaft 13 so as to engage with the second rotation shaft 13 having a columnar shape.

It is preferred that the second engagement section 23a is formed at a position at which the engagement with the second rotation shaft 13 is easily released when the piece 21 to be guided moves from the second groove section 11b to the first groove section 11a or the third groove section 11c.

In the exemplary embodiment, the second engagement section 23a is formed at the end of the second rotation piece 23. It is preferred that the second engagement section 23a is formed at the corner of the second rotation piece 23. It is further preferred that the second engagement section 23a is formed so that the second rotation piece 23 is not caught by the second rotation shaft 13 when the piece 21 to be guided moves from the second groove section 11b to the first groove section 11a. Namely, it is further preferred that the second engagement section 23a is formed at the corner (right side) further apart from the second groove section 11b when the body 20 to be guided is positioned at a position shown in FIG. 8.

In the exemplary embodiment, the engagement release section 14 is disposed along the third groove section 11c. The second rotation piece 23 engages with the second rotation shaft 13 and rotates. The engagement release section 14 is brought into contact with the second rotation piece 23 when the piece 21 to be guided moves to the intersection point of the second groove section 11b and the third groove section 11c along the second groove section 11b. Whereby, the engagement release section 14 releases the engagement between the second engagement section 23a of the second rotation piece 23 and the second rotation shaft 13. Therefore, it is preferred that a setting is performed such that the engagement release section 14 is brought into contact with the second rotation piece 23 when the piece 21 to be guided reaches near the intersection point, in other words, near the end of the movement of the second groove section 11b. As a result, the body 21 to be guided can be moved from the second groove section 11b to the third groove section 11c smoothly. Further, in the exemplary embodiment, only the engagement release section which releases the engagement between the second rotation piece 23 and the second rotation shaft 13 when the piece 21 to be guided is moved from the second groove section 11b to the third groove section 11c has been described. However, if it is needed to release the engagement between the rotation piece and the rotation shaft at another position, the engagement release section may be provided at the another position. A plurality of engagement release sections may be provided.

An elastic member 31 acts so that the relative position and direction of the first member 1 relative to the second member 2 are fixed. For example, the elastic member 31 acts so as to fix the first member 1 and the second member 2 in the first state to the third state shown in FIG. 2. More specifically, for example, the elastic member 31 is connected to the guide body 10 and the body 20 to be guided. In this case, the elastic member 31 acts so as to press the piece 21 to be guided in an outer loop direction or an inner loop direction of the guide groove 11.

The third rotation shaft 15 is a shaft for rotating the elastic member 31 relative to the guide body 10. In this exemplary embodiment, the third rotation shaft 15 is formed at the side of the guide body 10 that faces the second member 2. Specifically, the third rotation shaft 15 is formed between the second member 2 and guide body 10 and at the inside of the loop of the guide groove 11. The elastic member 31 is also disposed at a side of the guide body 10 that faces the second member 2. One end of the elastic member 31 is rotatably connected to the third rotation shaft 15. The other end of the elastic member 31 is rotatably connected to the piece 21 to be guided. For example, a torsion coil spring can be used as the elastic member 31. As a result, the elastic member 31 acts according to the displacement situation of each of the members 1 and 2, in other words, the position of the piece 21 to be guided. Namely, the elastic member 31 acts so as to fix the piece 21 to be guided to any one of the intersection point of the first groove section 11a and the second groove section 11b, the intersection point of the second groove section 11b and the third groove section 11c, and the intersection point of the third groove section 11c and the first groove section 11a.

In the exemplary embodiment, the elastic member 31 and the third rotation shaft 15 are positioned at the side of the guide body 10 that faces the second member 2, in other words, between the second member 2 and the guide body 10. However, it is not limited to this, if no problem occurs with respect to the position at which the first rotation shaft 12, the second rotation shaft 13, and the engagement release section 14 are positioned. Namely, the elastic member 31 and the third rotation shaft 15 may be positioned at the side of the guide body 10 that faces the first member 1, in other words, between the first member 1 and the guide body 10. In this case, a sliding mechanism 40 of the present invention can be made thinner. Therefore, the distance between the first member 1 and the second member 2 can be reduced.

The desired material of each component in the sliding mechanism of the exemplary embodiment is a metallic material for example, stainless steel, iron or the like. However, it is not limited in particular.

[Third Exemplary Embodiment]

Next, the exemplary embodiment of the sliding device of the present invention that includes the sliding mechanism will be described. It is assumed that the sliding device in the exemplary embodiment is a portable terminal. In FIG. 10 to FIG. 16, a schematic plan view of the exemplary embodiment is shown in the upper part and a schematic plan view of the portable terminal corresponding to the illustrated sliding mechanism is shown in the lower part. Further, the elastic member is shown in a perspective view in the schematic plan view of the sliding mechanism shown in the upper part.

A portable terminal 100 includes a first case 111, a second case 121, and the sliding mechanism 40 of the second exemplary embodiment. The first case 111 has a display section 112 such as a display or the like. The second case 121 has an input section 122 such as an input button (character key) or the like. The sliding mechanism 40 is disposed between the first case 111 and the second case 121. In the exemplary embodiment, the body 20 to be guided of the sliding mechanism 40 is fixed on a surface of the first case 111 that faces the second case 121, in other words, a surface side opposite to the display section 112, by screwing, bonding, welding, or the like (refer to FIG. 6). The guide body 10 is fixed on a surface of the second case 121 that faces the first case 111, in other words, the surface side to which the input section 122 is disposed, by screwing, bonding, welding, or the like (refer to FIG. 7). As shown in FIG. 7, the guide body 10 is disposed such that the third groove section 11c extends parallel to the longitudinal direction of the second case 121 (the second member 2 in FIG. 7). The guide body 10 is disposed such that the intersection point of the second groove section 11b and the third groove section 11c is closer to the end of the second case 121. As a result, the input section 122 can be exposed. As shown in FIG. 6, the body 20 to be guided is disposed such that the second rotation piece 23 extends parallel to the longitudinal direction of the first case 111 (the first member 1 in FIG. 6). The body 20 to be guided is disposed such that the piece 21 to be guided is positioned at the intersection point of the first groove section 11a and the third groove section 11c when the first case 111 and the second case 121 are overlapped so that the overlap surfaces thereof overlap each other.

The portable terminal 100 of the exemplary embodiment has the sliding mechanism 40 of the second exemplary embodiment. Therefore, the state of the portable terminal can be directly changed from one of the most compact state, a display section vertically long state, and the display section horizontally long state to another arbitrary state mutually. Further, the most compact state is a state convenient for carrying the portable terminal and for example, it is the first state shown in FIG. 2A. A display section vertically long state is a state convenient for making a telephone call or entering a character and for example, it is the second state shown in FIG.

2B. The display section horizontally long state is a state convenient for viewing television and for example, it is the third state shown in FIG. 2C.

Next, the operation of the sliding mechanism in the exemplary embodiment will be described by taking the portable terminal of the exemplary embodiment as an example with reference to FIG. 10 to FIG. 16. A state A shown in FIG. 10 corresponds to the first state shown in FIG. 2A. A state C shown in FIG. 12 corresponds to the third state shown in FIG. 2C. A state F shown in FIG. 15 corresponds to the second state shown in FIG. 2B.

By FIG. 10 to FIG. 16 that show the state A to an intermediate state G, it is shown that the state of the portable terminal 100 can be changed in this order from the current state to the previous state or the next state in a reversible fashion. For example, the state of the portable terminal 100 can be changed from the intermediate state B shown in FIG. 11 to the state A shown in FIG. 10 or the state C shown in FIG. 12. Namely, the state of the portable terminal 100 can be changed as follows: state A (FIG. 10) ⇔ intermediate state B (FIG. 11) ⇔ state C (FIG. 12) ⇔ intermediate state D (FIG. 13) ⇔ intermediate state E (FIG. 14) ⇔ state F (FIG. 15) ⇔ intermediate state G (FIG. 16) ⇔ state A (FIG. 10). In the following description, a case in which the state is changed as follows: state A–>intermediate state B–>state C–>intermediate state D–>intermediate state E–>state F–>intermediate state G will be described.

In the state A shown in FIG. 10, the overlap surface of the first case 111 and the overlap surface of the second case 121 of the portable terminal 100 completely overlap each other. At that time, in the sliding mechanism 40, the piece 21 to be guided is positioned at the intersection point of the first groove section 11a and the third groove section 11c. The piece 21 to be guided is fixed at the intersection point by a force that acts toward the outside of the curve of the elastic member 31. The first engagement section 22a of the first rotation piece 22 is close to the first rotation shaft 12. It is preferred that the first engagement section 22a is in contact with the first rotation shaft 12. The second rotation piece 23 extends in approximately the same direction as the third groove section 11c. It is preferred that the second rotation piece 23 extends on the line of the third groove section 11c.

The intermediate state B shown in FIG. 11 is a state in which the first case 111 is moved upward relative to the second case 121 and rotated counterclockwise in order to change the state from the first state to the third state. At that time, in the sliding mechanism 40, the first engagement section 22a of the first rotation piece 22 engages with the first rotation shaft 12. The body 20 to be guided (first case 111) is rotated about the first rotation shaft 12. The piece 21 to be guided exists in the first groove section 11a. In this state, the state of the portable terminal 100 can be easily changed from the intermediate state B to the state A (first state) or the state C (third state) by the action of the elastic member 31.

In the state C shown in FIG. 12, the longitudinal direction of the first case 111 and the longitudinal direction of the second case 121 cross at right angles. Additionally, the display section 112 is horizontally long. At that time, in the sliding mechanism 40, the piece 21 to be guided is positioned at the intersection point of the first groove section 11a and the second groove section 11b. The piece 21 to be guided is fixed at the intersection point by the force that acts toward the outside of the curve of the elastic member 31. The second engagement section 23a of the second rotation piece 23 is close to the second rotation shaft 13. It is preferred that the second engagement section 23a is in contact with the second rotation shaft 13.

The intermediate state D shown in FIG. 13 is a state in which the first case 111 is moved upward relative to the second case 121 and rotated clockwise in order to change the state from the third state to the second state. At that time, in the sliding mechanism 40, the second engagement section 23a of the second rotation piece 23 engages with the second rotation shaft 13. The body 20 to be guided (first case 111) is rotated about the second rotation shaft 13. The piece 21 to be guided exists in the second groove section 11b. In this state, the state of the portable terminal 100 can be easily changed from the intermediate state D to the state F (second state) or the state C (third state) by the action of the elastic member 31.

The intermediate state E shown in FIG. 14 is a state of just before the state F when the state is changed from state C to the state F. At that time, in the sliding mechanism 40, the second rotation piece 23 is in contact with the engagement release section 14. The piece 21 to be guided is positioned near the intersection point of the second groove section 11b and the third groove section 11c. When the second rotation piece 23 contacts with the engagement release section 14, the engagement between the second engagement section 23a of the second rotation piece 23 and the second rotation shaft 13 is released.

In the state F shown in FIG. 15, the input section 122 is exposed. The display section 112 is set to the vertically long state. Therefore, it appears that the total length of the portable terminal 100 is increased. The vertical direction of the display section 112 is the same as that in the state A shown in FIG. 10. At that time, in the sliding mechanism 40, the piece 21 to be guided is positioned at the intersection point of the second groove section 11b and the third groove section 11c. The piece 21 to be guided is fixed at the intersection point by the force that acts toward the outside of the curve of the elastic member 31. The second engagement section 23a of the second rotation piece 23 is close to the second rotation shaft 13.

The intermediate state G shown in FIG. 16 is a state in which the first case 111 is moved downward relative to the second case 121 in order to change the state from the second state to the first state. At that time, in the sliding mechanism 40, the piece 21 to be guided exists in the third groove section 11c. The first rotation piece 22 and the second rotation piece 23 do not engage with the first rotation shaft 12 and the second rotation shaft 13. In this state, the state of the portable terminal 100 can be easily changed from the intermediate state G to the state A (first state) or the state F (second state) by the action of the elastic member 31.

In the above-mentioned description, only the change in the state in which the state is changed as follows: state A—>intermediate state B–>state C–>intermediate state D–>intermediate state E–>state F–>intermediate state G has been described. However, by the sliding mechanism and the portable terminal of the exemplary embodiment, the change in the state in which the state is changed as follows: intermediate state G–>state F, state F–>intermediate state E, intermediate state E–>intermediate state D, intermediate state D–>state C, state C–>intermediate state B, intermediate state B–>state A, and state A–>intermediate state G can also be achieved. Because each of the changes can be understood based on the above-mentioned description, the description will be omitted here.

By using the exemplary embodiment, the change in the state between arbitrary two states among the state A (first state), the state C (third state), and the state F (second state) can be directly achieved in a reversible fashion without passing through the other state. Additionally, it can be achieved via the other state. In this case, for example, in the change in the state in which the state is changed as follows: state A–>intermediate state B–>state C–>intermediate state D–>intermediate state E–>state F–>intermediate state G, the vertical direction of the display section 112 in the state A (first state) can be made the same as that in the state F (second state). This is because the rotation direction of the first case 111 relative to the second case 121 in the change from the state A (first state) to the state C (third state) is opposite to the rotation direction of the first case 111 relative to the second case 121 in the change from the state C (third state) to the state F (second state). Additionally, by making the rotation centers thereof differentiate from each other, the first case 111 and the second case 121 can be moved in one direction without changing the vertical direction of the display section 112 between the state A (first state) and the state F (second state).

In the exemplary embodiment, the change from one of the state A (first state), the state C (third state), and the state F (second state) to another state can be easily (for example, automatically) carried out by the action of the elastic member 31 by only the initial operation.

In the exemplary embodiment, the body 20 to be guided of the sliding mechanism 40 is fixed on the first case 111 and the guide body 10 is fixed on the second case 121. However, it is not limited to this. Namely, the body 20 to be guided may be fixed on the second case and the guide body 10 may be fixed on the first case.

[Fourth Exemplary Embodiment]

Next, a fourth exemplary embodiment of the present invention will be described. The exemplary embodiment deserves the other exemplary embodiment of the sliding mechanism in the second exemplary embodiment.

The sliding mechanism of the exemplary embodiment includes a body to be guided disposed on one member and a guide body which is disposed on the other member and guides the body to be guided. The body to be guided has a piece to be guided, a first rotation piece, and a second rotation piece. The guide body has an annular guide groove which guides the piece to be guided, a first rotation shaft which engages with the first rotation piece and acts as the rotation center, and a second rotation shaft which engages with the second rotation piece and acts as the rotation center. The guide groove has an arc-shaped first groove section, an arc-shaped second groove section, and a linear third groove section. When the first rotation piece is brought into engagement with the first rotation shaft and either of the members is rotated, the piece to be guided is guided along the first groove section. When the second rotation piece is brought into engagement with the second rotation shaft and either of the members is rotated, the piece to be guided is guided along the second groove section.

It is preferred that the first rotation piece and the second rotation piece are connected to the piece to be guided, respectively.

Additionally, it is preferred that the first rotation piece and the second rotation piece are integrally formed in an L-shape.

Additionally, it is preferred that the first rotation piece has the first engagement section for engaging with the first rotation shaft. The second rotation piece has the second engagement section for engaging with the second rotation shaft.

Further, it is preferred that the guide body further has the engagement release section which is brought into contact with the first rotation piece or the second rotation piece at the time of a rotation motion of the first rotation piece or the second rotation piece and releases at least one engagement in the engagement between the first rotation piece and the first rotation shaft and the engagement between the second rotation piece and the second rotation shaft.

Further, it is preferred that the first groove section is an inward convex arc relative to the loop of the guide groove. The second groove section is an outward convex arc relative to the loop of the guide groove. The second rotation shaft is disposed outside the third groove section relative to the loop of the guide groove. The engagement release section is disposed at a position closer to the intersection point than the second rotation shaft so that the engagement release section contacts with the second rotation piece and releases the engagement between the second rotation piece and the second rotation shaft when the piece to be guided passes in the second groove section and reaches near the intersection point of the second groove section and the third groove section.

Additionally, it is preferred that the sliding mechanism further includes the elastic member. The elastic member is rotatably connected to the guide body and the body to be guided and presses the body to be guided in an outer loop direction or an inner loop direction of the guide groove.

Additionally, it is preferred that one end of the elastic member is rotatably connected to the inside of the loop of the guide groove. The other end of the elastic member is rotatably connected to the piece to be guided.

Additionally, it is preferred that the elastic member is the torsion coil spring.

Additionally, it is preferred that the elastic member is disposed between the guide body and the other member.

By using the sliding mechanism in the exemplary embodiment, the state is changed from any one of a first state in which at least a part of the first member and a part of the second member overlap each other, a second state in which one of the first member and the second member is moved in parallel to the other member from the first state, and a third state in which one of the first member and the second member is rotated and moved relative to the other member from the first state to another arbitrary state without passing through the other state like the second exemplary embodiment.

It is preferred that the state is changed from any one of the first state, the second state, and three states to another arbitrary state via the other state.

Additionally, it is preferred that the rotation direction of one member with respect to the other member in the change from the first state to the third state is opposite to the rotation direction of the one member with respect to the other member in the change from the third state to the second state.

It is preferred that a rotation center in the change from the first state to the third state is different from the rotation center in the change from the second state to the third state.

[Fifth Exemplary Embodiment]

Next, a fifth exemplary embodiment of the present invention will be described. The exemplary embodiment is an exemplary embodiment of a sliding device having the sliding mechanism described in the fourth exemplary embodiment. It is assumed that the sliding device in the exemplary embodiment is a portable terminal.

The portable terminal in the exemplary embodiment includes a first case, a second case in which the first case and at least a part of the second case overlap each other, and a sliding mechanism which is disposed between the first case and the second case and connects one case and the second case. By using the sliding mechanism, the state can be changed from any one of a first state in which at least a part of the first case and a part of the second case overlap each other, a second state in which one of the first case and the second case is moved in parallel to the other case from the first state, and a third state in which one of the first case and the second case is rotated and moved relative to the other case from the first state to another arbitrary state without passing through the other state.

Additionally, it is preferred that the first case has a display section on the surface opposite to the surface that faces the second case. The second case has an input section on the surface thereof that faces the first case. The first state is a state in which an overlapping area of the first case and the second case is the largest among the three states: the first state, the second state, and the third state. The second state is a state in which one case is moved in parallel to the other case in a longitudinal direction of a display section from the first state. The third state is a state in which the display section is rotated by 90 degrees from the direction of the display section in the first state or the second state. The vertical direction of the display section in the first state is the same as that in the second state.

The explanation of the sliding mechanism and the sliding device of the present invention has been made based on the above-mentioned exemplary embodiment. However, those are not limited to the above-mentioned exemplary embodiment. Namely, various modifications, changes, or improvements can be included to the above-mentioned exemplary embodiment without departing from the scope of the present invention and based on the basic technological thought of the present invention. Various combinations, substitutions, or selections of various disclosed elements can be made without departing from the scope of the claims of the present invention.

Further problem, purpose, and a development form of the present invention are shown by all the disclosed matters of the present invention including the claims.

Industrial Applicability

In the above-mentioned description, the explanation about the sliding mechanism of the present invention has been made based on the embodiment in which the sliding mechanism is applied to the portable terminal. However, it is not limited to this. Namely, the sliding mechanism of the present invention can be applied to a device, an equipment, or the like in which two members are slid.

The invention claimed is:

1. A sliding mechanism disposed between a first member and a second member including:
   a body to be guided which is disposed on the first member; and
   a guide body which is disposed on the second member and guides the body to be guided, and wherein
   the guide body has an annular guide groove for guiding the body to be guided and
   the guide groove has at least three groove sections including an arc-shaped groove section and a linear groove section.

2. The sliding mechanism described in claim 1 wherein
   the body to be guided includes a piece to be guided, a first rotation piece, and a second rotation piece,
   the guide body includes a first rotation shaft that engages with the first rotation piece and acts as a rotation center and a second rotation shaft that engages with the second rotation piece and acts as the rotation center,
   the guide body guides the piece to be guided to the guide groove, and
   the guide groove includes an arc-shaped first groove section, an arc-shaped second groove section, and a linear third groove section.

3. The sliding mechanism described in claim 2 wherein
   the piece to be guided is guided along the first groove section when the first rotation piece is brought into engagement with the first rotation shaft and either the first member or the second member is rotated, and the piece to be guided is guided along the second groove section when the second rotation piece is brought into engagement with the second rotation shaft and either the first member or the second member is rotated.

4. The sliding mechanism described in claim 2 wherein the first rotation piece and the second rotation piece are joined to the pieces to be guided respectively.

5. The sliding mechanism described in claim 2 wherein the first rotation piece and the second rotation piece are integrally formed in an L-shape.

6. The sliding mechanism described in claim 2 wherein the first rotation piece includes a first engagement section for engaging with the first rotation shaft and the second rotation piece includes a second engagement section for engaging with the second rotation shaft.

7. The sliding mechanism described in claim 2 wherein the guide body further includes an engagement release section which is brought into contact with the first rotation piece or the second rotation piece at the time of a rotation motion of the first rotation piece or the second rotation piece and releases at least one engagement in the engagement between the first rotation piece and the first rotation shaft and the engagement between the second rotation piece and the second rotation shaft.

8. The sliding mechanism described in claim 7 wherein
the first groove section is an inward convex arc relative to a loop of the guide groove,
the second groove section is an outward convex arc relative to the loop of the guide groove,
the second rotation shaft is disposed outside the third groove section relative to the loop of the guide groove, and
the engagement release section is disposed closer to an intersection point of the second groove section and the third groove section than the second rotation shaft.

9. The sliding mechanism described in claim 1 wherein
the sliding mechanism further includes an elastic member, and
the elastic member is rotatably connected to the guide body and the body to be guided and presses the body to be guided in an outer loop direction or an inner loop direction of the guide groove.

10. The sliding mechanism described in claim 9 wherein
one end of the elastic member is rotatably connected to an inside of the loop of the guide groove and the other end of the elastic member is rotatably connected to the piece to be guided.

11. The sliding mechanism described in claim 9 wherein the elastic member is a torsion coil spring.

12. The sliding mechanism described in claim 9 wherein the elastic member is disposed between the guide body and the second member.

13. A sliding device comprising:
a first case;
a second case; and
the sliding mechanism described in claim 1 which is disposed between the first case and the second case, wherein
the first case corresponds to one member that is either the first member or the second member and
the second case corresponds to the other member that is not the one member in the first member and the second member.

14. The sliding device described in claim 13 wherein
the first case includes a display section on a surface opposite to the surface that faces the second case,
the second case includes an input section on a surface thereof that faces the first case,
the state of the first case and the second case is changed among a first state, a second state, and a third state,
the first state is a state in which an overlapping area of the first case and the second case is the largest in three states that are the first state, the second state, and the third state,
the second state is a state in which one of the first case and the second case is moved in parallel to the other case in a longitudinal direction of the display section from the first state,
the third state is a state in which the display section is rotated by 90 degrees from the direction of the display section in the first state or the second state, and
a vertical direction of the display section in the first state is the same as the vertical direction of the display section in the second state.

\* \* \* \* \*